(12) United States Patent
Chard et al.

(10) Patent No.: US 7,139,988 B2
(45) Date of Patent: Nov. 21, 2006

(54) MODELING METASTABILITY IN CIRCUIT DESIGN

(75) Inventors: Gary F. Chard, Richardson, TX (US); Osman Koyuncu, Plano, TX (US); T-Pinn R. Koh, Allen, TX (US); Steve Dondershine, Murphy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 273 days.

(21) Appl. No.: 10/838,482

(22) Filed: May 4, 2004

(65) Prior Publication Data

US 2005/0251779 A1 Nov. 10, 2005

(51) Int. Cl.
*G06F 17/50* (2006.01)
(52) U.S. Cl. ............... 716/4; 716/5; 716/6; 716/18
(58) Field of Classification Search .......... 716/6, 716/5, 4, 1; 715/4, 3, 5, 6, 18, 1
See application file for complete search history.

(56) References Cited

U.S. PATENT DOCUMENTS

2005/0268265 A1* 12/2005 Ly et al. ................ 716/6

OTHER PUBLICATIONS

Ly et al., "Formally Verifying Clock Domain Crossing Jitter Using Assertion-Based Verification", Feb. 2004, DVcon, 5 pages.*
Kwok et al., "Using Assertion-Based Verification to Verify Clock Domain Crossing Signals", Feb. 2003, DVcon, 9 pages.*
Ginosar, "Fourteen Ways to Fool Your Synchronizer", May 2003, IEEE Symposium on Asynchronous Circuits and Systems, Proceedings, pp. 89-96.*
Willoughby et al., "Inclusive Verification Newsletter", Canden, May 2004, pp. 1-23.*
Yeung et al., "The Four Pillar of Asseration-Based Verification", 2004, Mentor Graphics, white paper, pp. 1-19.*
Lipman, "Chip Simulation/Verification Tool Suite "Goes Deep" in Finding Bugs", Jan. 2003, TechOnLine, 5 pages.*
David Maliniak, "Assertion-Based Verification Smoothes The Road to IP Reuse", ED Online, Sep. 16, 2002.
Author unknown, "Assertion-Based Verification", Synopsys, Mar. 2003, 2002 Synopsys, Inc., pp. 1-13.

* cited by examiner

*Primary Examiner*—Sun James Lin
(74) *Attorney, Agent, or Firm*—W. James Brady, III; Frederick J. Telecky, Jr.

(57) ABSTRACT

A computer program (100, 200) encoded in a computer-programmable medium, and for causing a computer to perform circuit design. The code causes the computer to perform a set of steps. The steps comprise describing a first set of circuitry and describing a second set of circuitry. The steps also comprise describing a digital signal for passing from the first set of circuitry to the second set of circuitry and detecting (230) transitions of the digital signal with respect to a timing constraint (240) of at least a portion of the second set of circuitry. Lastly, the steps comprise, responsive to detecting metastability with respect to timing of a transition of the digital signal relative to the timing constraint of at least a portion of the second set of circuitry, forcing (160) the digital signal to a random value and passing the random value to the second set of circuitry.

21 Claims, 4 Drawing Sheets

MODELING METASTABILITY IN CIRCUIT DESIGN

CROSS-REFERENCES TO RELATED APPLICATION

Not Applicable.

STATEMENT REGARDING FEDERALLY SPONSORED RESEARCH OR DEVELOPMENT

Not Applicable.

COPYRIGHT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

The present embodiments relate to circuit design flow and are more particularly directed to including consideration of metastability into the circuit design flow.

Circuit design flow includes at least two general steps. Typically using some combination of hardware and/or software, in a first step the designer creates a functional behavioral model such as by way of example in a register transfer level ("RTL") design. In this first step, the functionality of the RTL level design is verified. Once the RTL functionality is verified, in a second step the RTL is synthesized into gate level circuitry and the designer performs gate level simulations. In this second step, functional wave timing is examined, which includes analyses of gate delays and interconnect delays.

While the preceding circuit design flow steps have proven workable in numerous contexts, the present inventors have observed various drawbacks, such as in the context of an asynchronous design. Asynchronous paths by definition include signals that pass from one clock domain to another. When this occurs from a first clock domain to a second clock domain, the timing of circuitry operating according to the second clock domain may be disrupted or operate inaccurately due to a signal that is still timed according to the first clock domain. This disruption is particularly evident in the context of a flip-flop in one clock domain that attempts to process a signal from a different clock domain. In this regard, a flip-flop is known in the art to have both a setup and hold time, typically indicated as $T_{su}$ and $T_h$, respectively. In general, a window of time is thereby defined that consists of the duration of both $T_{su}$ and $T_h$ and during that window the clock is expected to transition at the flip-flop; further, for proper operation of the flip-flop, its input data should not transition during this $T_{su}+T_h$ window, that is, it should not transition during either $T_{su}$ or $T_h$. However, if the data input is from one clock domain while the flip-flop is clocked by a different, and hence asynchronous, clock domain, then indeed the data may transition during the $T_{su}+T_h$ window. If this occurs, it is said that there is either a setup or hold time violation, and as a result the flip-flop enters a state where its output is unpredictable. This unpredictable output, therefore, may be either a binary 1 or 0, and this state is referred to as metastability.

Given the chance and indeed likelihood of metastability, designers at both the RTL and gate level design levels have heretofore been provided certain approaches that the present inventors have observed not to adequately contemplate the reality of metastability. With respect to RTL, it is primarily directed to the presentation or collection of functionality and, thus, has not concerned itself with the concept of timing. Indeed, RTL instead assumes ideal timing with respect to the propagation of signals. As a result, metastability, which often arises from asynchronous connectivity as described above, is not addressed during the RTL design flow. With respect to gate level simulations, circuits from cell libraries are assigned whereby certain circuitry and timing tables may be attributed to different RTL functions. However, for asynchronous paths, prior art gate level simulations in effect permit the violation of timing in that proper timing is assumed not important. Moreover, if the assumption holds untrue or for other reasons, the designer heretofore has the option of designating any desired path as a "false path," after which it is removed from any test that is imposed during the gate level simulations. Moreover, once designated as a false path, the timing on the path is turned off, negating the whole point of gate level simulations with timing. Instead, precise data capture is assumed to occur. If it is not labeled as a false path and timing is kept, then data on that path is indicated as an "x". When violation occurs, the effect of that data as it further propagates through the design is no longer meaningful nor analyzed and the simulation will in likelihood be invalidated. Thus, there is no accountability for correct functionality at either the RTL or gate level simulations as to the effects of metastability.

As a result of the preceding, it is not uncommon for integrated circuits to be constructed according to a design that was developed according to the prior art, only to learn after the construction of the device that it does not operate properly due to metastability. In view of this result, there arises a need to address the drawbacks of the prior art as is achieved by the preferred embodiments described below.

BRIEF SUMMARY OF THE INVENTION

In one preferred embodiment, there is a computer program encoded in a computer-programmable medium, and for causing a computer to perform circuit design. The code causes the computer to perform a set of steps. The steps comprise describing a first set of circuitry and describing a second set of circuitry. The steps also comprise describing a digital signal for passing from the first set of circuitry to the second set of circuitry and detecting transitions of the digital signal with respect to a timing constraint of at least a portion of the second set of circuitry. Lastly, the steps comprise, responsive to detecting metastability with respect to timing of a transition of the digital signal relative to the timing constraint of at least a portion of the second set of circuitry, forcing the digital signal to a random value and passing the random value to the second set of circuitry.

Other aspects are also disclosed and claimed.

DETAILED DESCRIPTION OF THE INVENTION

In accordance with the preferred embodiments, various code is included in either or both of the circuit functional level (e.g., register transfer level ("RTL") or any other language used to describe and model circuitry) or gate simulation design flow so as to improve these design flows in the context of metastability. To better appreciate these aspects, the discussion below first address the functional aspect, using RTL as a preferred example, and is then followed with the gate level aspect.

In connection with improving the RTL design flow so as to provide for improved testing with the possibility of metastability, the preferred embodiments include sufficient code so as to provide a behavioral form of potential metastability at the edge between RTL functions where a signal will cross from one clock domain to another. This code is further described below, but first various observations are noteworthy. As a first observation, note that in circuit design, often a so-called synchronizer is physically constructed at each such edge (at clock crossings), where a synchronizer is intended to include those devices constructed so as to adjust the timing of a signal that is timed according to a first clock domain so that it will satisfy proper timing once it passes into circuitry operating according to a second, and different, clock domain. In the preferred embodiment, the code described later is provided in a behavioral form at the same edge as would be located a corresponding synchronizer in the physical circuit sense. By way of further understating in this regard, note that often such a synchronizer is constructed by having the first clock domain signal as an input to a first flip-flop, where the output of the first flip-flop is connected as an input to a second flip-flop, and the clock inputs of both flip-flops are connected to the clock signal of the second clock domain. With this configuration, even if the first clock domain signal is asynchronous with respect to the second clock domain and, thus, initially causes a metastable output from the first flip-flop, then in most cases that output will have sufficient time to settle to one of two binary states by time the clock signal of the second clock domain next transitions, thereby providing a stable output from the second flip-flop. Note that this configuration is one of many examples, where others are also known in the art and may include more than two flip-flops and also may be of various types such as level or pulse synchronizers. As a second observation, while the preferred embodiment includes the code introduced above and detailed below, note further that the behavioral code is, insofar as it models metastability, indicated in a manner such that it is non-synthesizable, that is, it is not synthesized during the subsequent synthesis operation; in other words, this code is not translated into a physical device when the later gate level formulation, based on the behavioral code, takes place. Thus, while useful for testing, the behavioral code is transparent to synthesis.

Figure 1:
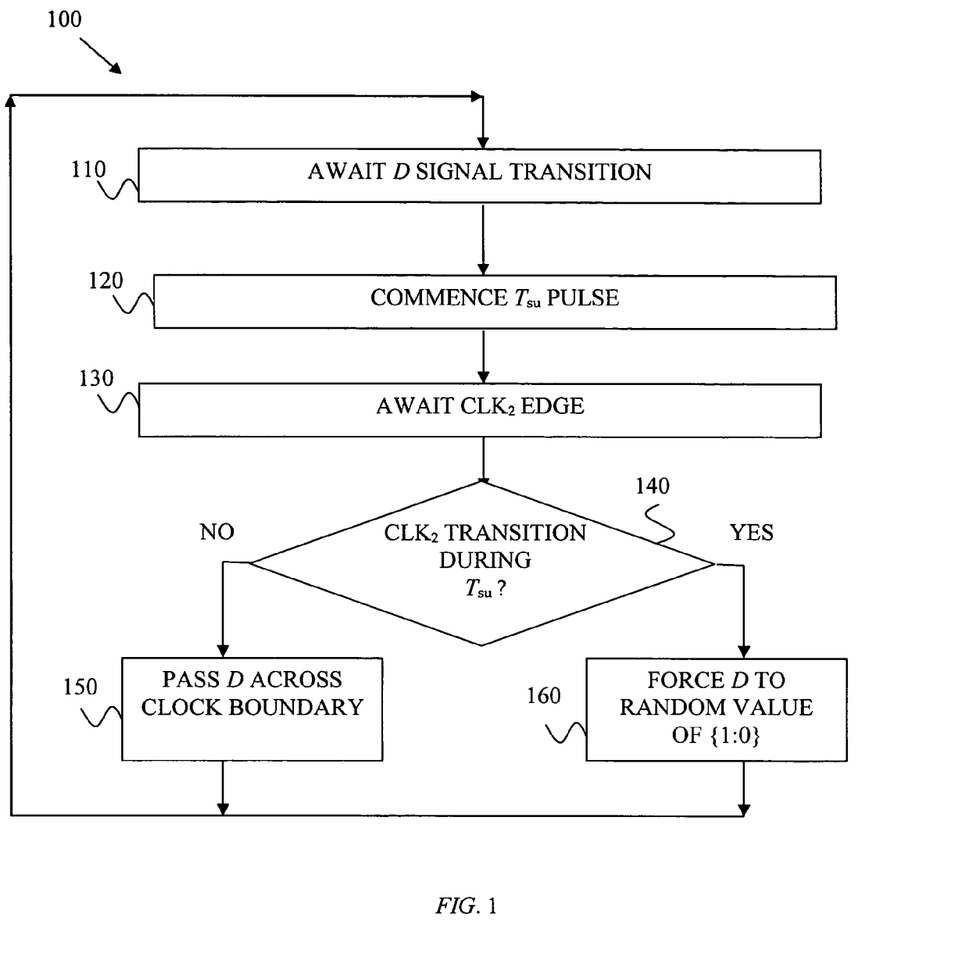
FIG. 1 illustrates a method in flow chart form and that depicts one set of steps implemented in the behavioral code according to the preferred embodiment and at the edge between clock boundaries, as directed to responding to a setup time.

FIG. 1 illustrates a method 100 that depicts one set of steps implemented in the behavioral code according to the preferred embodiment and at the edge between clock boundaries as introduced above. By way of further introduction, note that the flowchart form is purely by way of illustration, while these steps may be implemented in various fashions whereby the behavioral code is processed by a computer comprising programmable hardware and/or software as ascertainable by one skilled in the art, and these steps are not language bound; thus, they may be incorporated in different manners according to a specific type of functional or behavioral language (e.g., Verilog or VHDL). Further, method 100 relates most directly to the preferred embodiment as it relates to considerations of metastability in circuit design and, thus, other aspects of circuit design will be known to one skilled in the art to be usable with this method, but they are neither shown nor described so as to simplify the discussion. In general, however, it should be recognized that along with method 100 the functional description of the preferred code will at least describe functionality of a first set of circuitry and a second set of circuitry, each having a respective clock domain, where a data signal D is to pass between those two sets of circuitry and where there are timing constraints between them as further detailed below. Method 100, however, adds a non-synthesizable metastability detection mechanism between those sets of circuitry. Turning to method 100, it commences with a step 110, which represents a wait state during which method 100 awaits the transition of the data signal, D, that is, the data signal that is passing across the edge between a first and second clock domain. Thus, initially D is synchronous to the clock of the first domain and asynchronous to the clock of the second domain. Once D transitions, method 100 continues from step 110 to step 120.

In step 120, method 100 commences a pulse for a setup time, $T_{su}$. The actual duration of $T_{su}$ may be established in various manners as may be ascertained by one skilled in the art. Once the $T_{su}$ pulse commences, method 100 continues from step 120 to step 130. Step 130 represents a wait state during which method 100 awaits a given transition of the clock signal in the second clock domain. For the sake of reference in this document and its figures, let the second clock domain clock signal be referred to as $CLK_2$. Thus, in step 130, and for example, assume that the given transition of $CLK_2$ is the rising transition, in which case step 130 awaits a rising transition of $CLK_2$. Once the $CLK_2$ transition occurs, then method 100 continues from step 130 to step 140.

Step 140 directs flow based on the relative timing of the step 110 transition in D and the immediately-following step 130 transition in CLK2, and further with respect to a timing constraint created by the duration of Tsu. More specifically, step 140 examines whether the CLK2 transition occurred during the duration of Tsu. If so, then method 100 continues from step 140 to step 160, whereas if CLK2 did not transition during the asserted high Tsu, then method 100 continues from step 140 to step 150.

Steps 150 and 160 operate to provide either a passage of the data signal D in response to a stable timing event or the provision of random behavior in a metastable event, as is now explored in greater detail and as is further appreciated from a few examples discussed later. Specifically, in step 150, which recall is reached when $CLK_2$ does not transition during $T_{su}$, then behaviorally the value of D, as it existed following its transition in step 110, is passed along the edge between the first and second clock domains (i.e., between the first and second sets of circuitry). As demonstrated below, this behavior corresponds to a stable transition of the data, that is, one which occurred at a time that should not provide metastability with respect to the clock signal in the second clock domain. In contrast, in step 160, which recall is reached when $CLK_2$ does transition during $T_{su}$, then the value of D is transformed to a random counterpart; toward this end, in step 160, the value of D is set randomly to a value of either binary state (e.g., 0 or 1), and that random value is passed along the edge between the first and second clock domains. As demonstrated below, this behavior corresponds to a metastable transition of the data, that is, one which occurred at a time that violates the setup time of the second clock domain.

Figure 2A:
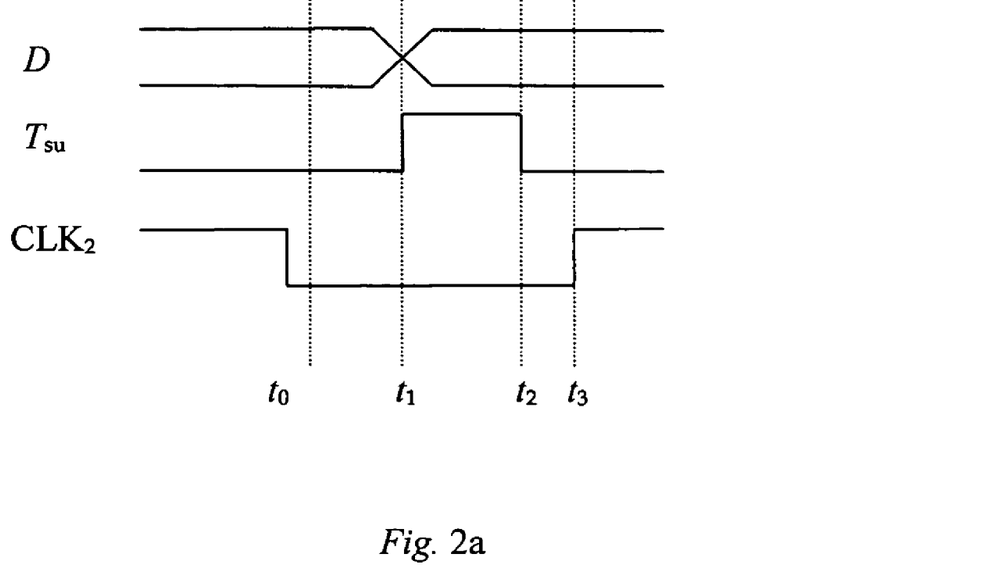
FIG. 2a illustrates a timing diagram of the signal transitions associated with the method of FIG. 1 and more particularly that provide for a stable transition of D between the two clock domains.

FIG. 2a illustrates a timing diagram of the signal transitions associated with method 100 and more particularly that provide for a functional implementation (e.g., RTL) of a stable transition of D between the two clock domains. Particularly, at time $t_0$ each of the three illustrated signals are at a steady state and, thus, time $t_0$ represents the wait state of step 110. At time $t_1$, D transitions, thereby causing method 100 to continue to step 120 and to commence $T_{su}$, which is shown to continue until time $t_2$. Also during this time, step 130 awaits the given transition of $CLK_2$. When $CLK_2$ transitions at time $t_3$, method 100 continues from step 130 to step 140, and for the example of FIG. 2a, it may be readily appreciated that the $CLK_2$ transition does not occur during the asserted high period of $T_{su}$. As a result, method 100 will reach step 150, and the value of D behaviorally provided across the edge between the first and second clock domains will be the same as D existed immediately following time $t_1$. In other words, in response to the scenario of FIG. 2a, no metastability was detected and, hence, the value of D is behaviorally unaffected and preserved across the clock domains.

Figure 2B:
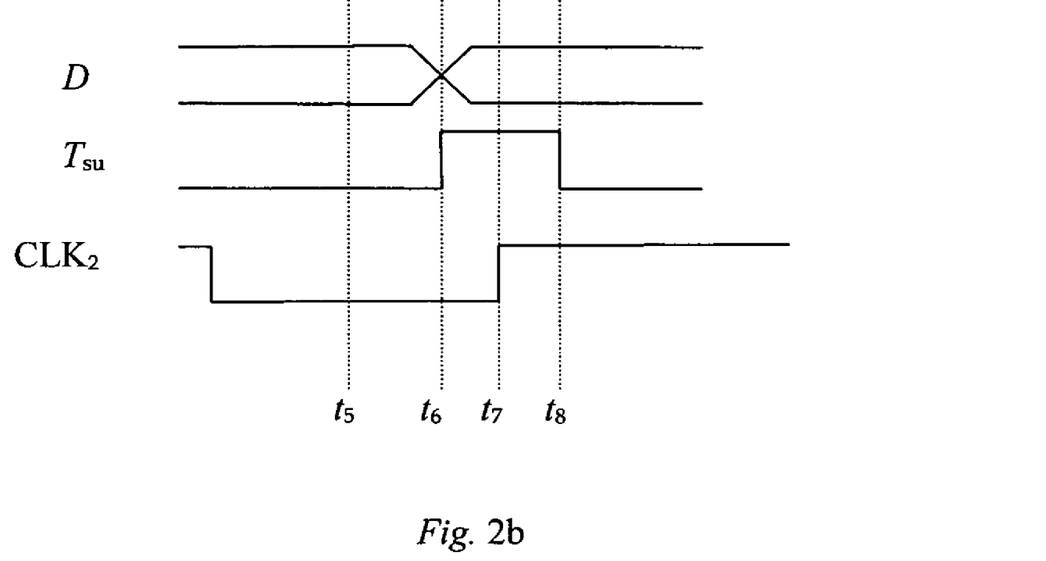
FIG. 2b illustrates a timing diagram of the signal transitions associated with the method of FIG. 1 and more particularly that respond to a metastable transition of D between the two clock domains.

FIG. 2b illustrates a timing diagram of the signal transitions associated with method 100 and more particularly that provide for a functional implementation of a metastable representation of D as it passes between the two clock domains. In FIG. 2b, times $t_5$ and $t_6$ correspond to times $t_0$ and $t_1$, respectively, of FIG. 2a. Thus, at time $t_5$ each of the three illustrated signals are at a steady state (the wait state of step 110) and at time $t_6$, D transitions causing the commencement of $T_{su}$ (by step 120), and after which step 130 awaits the given transition of $CLK_2$. When $CLK_2$ transitions at time $t_7$, method 100 continues from step 130 to step 140; however, in the example of FIG. 2b, it may be readily appreciated that the $CLK_2$ transition occurs during the asserted high period of $T_{su}$. As a result, method 100 will reach step 160, and the behaviorally-provided value of D is forced to a random binary value and that value is behaviorally provided across the edge between the first and second clock domains. In other words, in response to the scenario of FIG. 2b, the metastability is detected because of the data transition occurring within the setup time, $T_{su}$, of $CLK_2$; as a result, the value of D is behaviorally assumed to be metastable, which is accomplished by selecting a random binary value and passing that value across the clock domains.

Given the preceding, one skilled in the art should appreciate that method 100 provides a behavioral analysis for detecting potential metastability during the setup time across clock domains. Such an analysis according to the preferred embodiment is included in the RTL or other behavioral model for circuit design flow and, as such, signal propagation across clock domains may be more accurately represented in connection with the setup time of a second clock domain relative to, and that follows, a first clock domain. Specifically, when no metastability is detected, then a signal passing from a first clock domain to a second clock domain is undisturbed, whereas when metastability is detected, then the signal passing from a first clock domain to a second clock domain is presented as a random behavior so as to exhibit the operational characteristics of actual circuit devices when operating in a metastable condition. Indeed, with this understanding, one skilled in the art will further appreciate the following discussion, wherein comparable results are also achieved during the hold time of the second clock domain.

Figure 3:
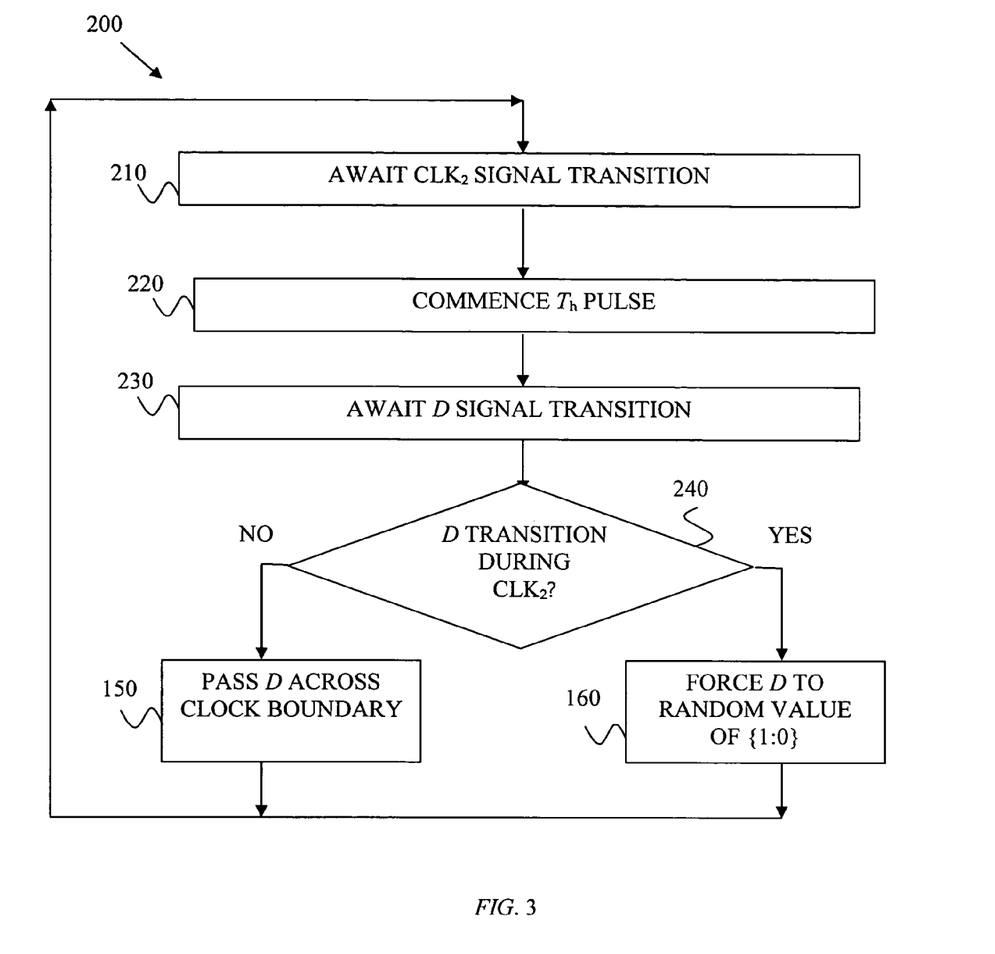
FIG. 3 illustrates a method in flow chart form and that depicts one set of steps implemented in the behavioral code according to the preferred embodiment and at the edge between clock boundaries, as directed to responding to a hold time.
Figure 4A:
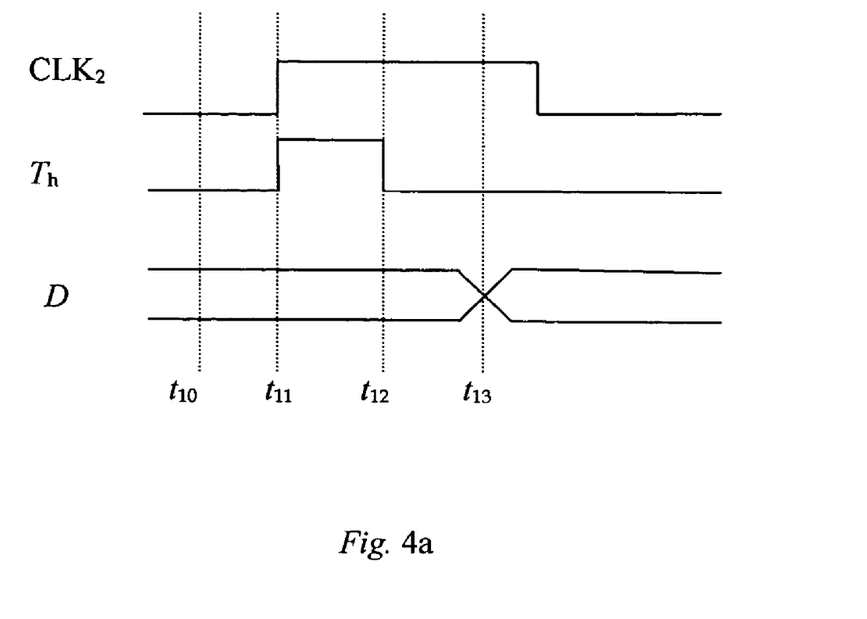
FIG. 4a illustrates a timing diagram of the signal transitions associated with the method of FIG. 3 and more particularly that provide for a stable transition of D between the two clock domains.
Figure 4B:
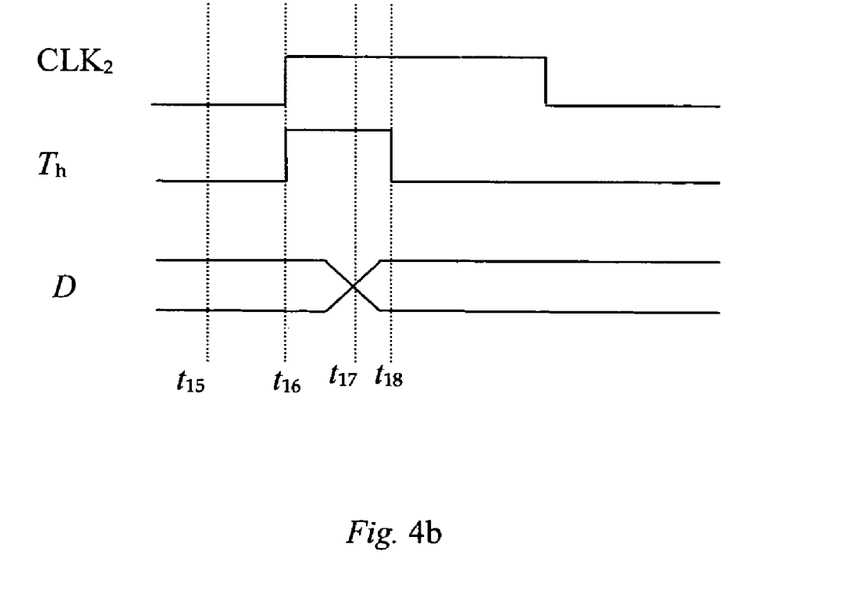
FIG. 4b illustrates a timing diagram of the signal transitions associated with the method of FIG. 3 and more particularly that respond to a metastable transition of D between the two clock domains.

FIG. 3 illustrates a method 200 that depicts another set of steps implemented in the behavioral code according to the preferred embodiment and also at the edge between clock boundaries as introduced above. Method 200 is comparable in some respects to method 100 of FIG. 1; as appreciated from the following, however, method 200 is directed to including appropriate behavioral responses to a transition of D after the given transition of $CLK_2$, whereas method 100, as described above, is directed to including appropriate behavioral responses to a transition of D before the given transition of $CLK_2$. Again with method 200 as was the case for method 100, the flowchart form is purely by way of illustration and its steps may be implemented in various fashions of code and are not language bound.

Turning to method 200, it commences with a step 210, which represents a wait state during which method 200 awaits a given transition of $CLK_2$, that is, the clock signal in the second clock domain. As in the earlier example, assume that the given transition is the rising transition, in which case step 210 awaits a rising transition of $CLK_2$. Once the given (e.g., rising) transition of $CLK_2$ occurs, then method 200 continues from step 210 to step 220.

In step 220, method 200 commences a pulse for a hold time, $T_h$. The actual duration of $T_h$ may be established in various manners as may be ascertained by one skilled in the art. Once the $T_h$ pulse commences, method 200 continues from step 220 to step 230. Step 230 represents a wait state during which method 200 awaits a transition of the data signal D. Once D transitions, method 200 continues from step 230 to step 240.

Step 240 directs flow based on the relative timing of the transition in D and the immediately-preceding transition in $CLK_2$, and further with respect to a timing constraint created by the duration of $T_h$. More specifically, step 240 examines whether the $CLK_2$ transition occurred during the asserted high duration of $T_h$. If so, then method 200 continues from step 240 to step 150, whereas if D did not transition during the asserted high duration of $T_h$, then method 200 continues from step 240 to step 160.

Steps 150 and 160 of FIG. 3 are the same as in FIG. 2 above and, thus, lesser detail is provided here as the reader is assumed familiar with the earlier discussion of those steps. Briefly, step 150 passes the data signal D in a stable event, or alternatively, step 160 provides a random behavior output value as a representation of D in a metastable event. In these instances of steps 150 and 160, however, the behavior is dictated in response to a transition in D after the given (e.g., rising) edge of $CLK_2$, and relative to $T_h$. In any event, if the timing of the D transition, following the rising edge of $CLK_2$ is after the asserted high duration of $T_h$, then stable behavior is modeled by passing D across the clock domains, whereas if D transitions during the asserted high duration of $T_h$, then metastable behavior is modeled by passing a random binary value across the clock domains.

From the above, it may be appreciated that the above embodiments provide for a functional design methodology that uses an appropriate behavioral code model to pass a data signal across clock domains of a circuit device. Specifically, a non-synthesizable behavioral code model is included at the edge between different clock domains and it generates and passes to the latter clock domain a random binary 1 or 0 if a timing constraint window, established over a time of $T_{su}+T_h$, is violated. Thus, actual metastable circuit operation of flip-flops is emulated at the functional level of circuit design flow. Moreover, when metastability is detected, a random data signal D is communicated forward across the clock boundary and, hence, to the second set of circuitry (and possibly beyond). As such, the random behavior is propagated so that the effect of the metastability, if any, may be evaluated beyond the point of the edge between the first and second clock domains. This allows incorrectly designed cross clock domains to be flushed out, if the timing window is violated several times during testing by propagating functional errors.

As stated earlier, the inclusion of methods 100 and 200 into functional code may be achieved in various manners as ascertainable by one skilled in the art. By way of example to illustrate one such approach, the following Table 1 depicts the embodiment as included in Verilog code.

TABLE 1

Copyright Texas Instruments Incorporated

```
//####################################################################
`timescale 1 ns / 1 ps
//####################################################################
// Module Declaration
//####################################################################
module synchronizer_level(
                                reset_n,
                                clock_in,
                                signal_In,
                                signal_out
                                );
//####################################################################
// Port Declaration
//####################################################################
input                           reset_n;
input                           clock_in;
input                           signal_in;
output                          signal_out;
//####################################################################
// Parameters
//####################################################################
//####################################################################
// Reg & Wires
//####################################################################
reg                             sync_ff_0;
reg                             sync_ff_1;
wire                            sync_ff_0_next;
wire                            sync_ff_1_next;
//synopsys translate_off
parameter                       SETUP_WINDOW_SIZE = 0.5 ;
parameter                       HOLD_WINDOW_SIZE = 0.5 ;
parameter                       SYNCHRONOUS = 0 ;
reg                             setup_window; initial setup_window = 0 ;
reg                             hold_window; initial hold_window = 0 ;
reg                             semaphore; initial semaphore = 1 ;
reg [31:0]                      random_value ;
event                           setup_violation, hold_violation;
//synopsys translate_on
//####################################################################
// Sequential Logic
//####################################################################
always@(posedge clock_in or negedge reset_n) begin
     if (!reset_n)
          begin
                sync_ff_0               <= 1'b0;
                sync_ff_1               <= 1'b0;
          end
     else
          begin
                sync_ff_0               <= sync_ff_0_next;
                sync_ff_1               <= sync_ff_1_next;
          end
end
```

TABLE 1-continued

Copyright Texas Instruments Incorporated

```
//##########################################################################
// Combinational Logic
//##########################################################################
//following is used for RTL level timing checks. If the data changes within 10psec
//from the posedge of the clock, the output of the flop is assigned a random value
//synopsys translate_off
//-----------------------------
always @(signal_in)
begin
    if (SYNCHRONOUS== 0) begin
        wait(semaphore) ; // semaphore to wait on
        begin // shared region
            semaphore = 0 ; // set the lock
            if(hold_window) // hold window is on and signal changed
                begin
                    ->hold_violation ;
                    force sync_ff_0 = random_value[0] ;
                end
            else
                release sync_ff_0 ;
            setup_window = 1 ;
            hold_window = 0 ;
            semaphore = 1 ; // release the semaphore
        end
    end
end
//-----------------------------
always @(posedge clock_in)
    begin
        if (SYNCHRONOUS == 0) begin
            random_value = $random ; // throw a random number every clock cycle
            wait(semaphore) ; // semaphore to wait on
            begin // shared region
                semaphore = 0 ;
                if(setup_window) // setup window is on and posedge on clock
                    begin
                        ->setup_violation
                        force sync_ff_0 = random_value[0] ;
                    end
                else
                    release sync_ff_0 ;
                    hold_window = 1 ;
                    setup_window = 0 ;
                    semaphore = 1 ;// release the semaphore
                end
            end // if (SYNCHRONOUS = 0)
        end // always @ (posedge clock_in)
always @(signal_in)
    begin
        #(SETUP_WINDOW_SIZE);
        setup_window = 0;
    end
always @(posedge clock_in)
    begin
        #(HOLD_WINDOW_SIZE);
        hold_window = 0;
    end
//-----------------------------
//synopsys translate_on
assign sync_ff_0_next        = signal_in;
assign sync_ff_1_next        = sync_fi_0;
assign signal_out            = sync_ff_1 ;
endmodule
```

Having demonstrated methods 100 and 200 with respect to the functional level of circuit design, in an alternative embodiment, comparable aspects may be implemented at the gate level of circuit design. As known in the art, the gate level of circuit design typically includes the use of various standard cells, wherein each cell represents a corresponding circuit element or elements. Further, as introduced earlier, in the prior art gate level of circuit design, various circuit timing is assumed to be false paths with timing disabled for those paths during that flow of testing, else they generate "x's" and invalidate the whole test. However, in the alternative preferred embodiment, methods 100 and 200 are implemented at the gate level testing flow in each flip-flop cell. Thus, within each gate level cell, a new code block is included so as to embody methods 100 and 200, thereby generating a random value signal in the cell module in response to detected metastability during either $T_{su}$ or $T_h$, respectively. In addition, preferably the cell is modified by adding a new port in the user defined primitive ("UDP") for the random value. Lastly, the code entry in the prior art that previously provided the "x" output due to signal changes is replaced with the value of D, which is unchanged in the case of step 150 (i.e., no metastability detected) or which is transformed to a random value of 0 or 1 in the case of step 160 (i.e., metastability detected).

In the alternative embodiment whereby a metastability function is added to each flip-flop gate level cell, metastability is detected if a timing violation occurs during the $T_{su}+T_h$ window of time during gate level testing. Since this function is preferably included in each flip-flop cell, then it serves to detect metastability regardless of the location of the flip-flop in a circuit. Thus, in one example, the flip-flop may be located as a first flip-flop in a synchronizer connected at the crossing of clock domains; in this case, the metastability function corresponding to that flip-flop in the gate level design flow will detect metastability arising from an asynchronous signal. However, in another example, the flip-flop may be located as a flip-flop within a single given clock domain and receiving data from that same given clock domain. While the possibility of metastability in such a location may be less than that at an asynchronous edge, the metastability function corresponding to that flip-flop in the gate level design flow will nonetheless detect metastability occurring within the single clock domain. In any event, when a metastable condition is represented in the flow (as provided by step 160), then the resulting random 0 or 1 propagates onward through the cell and through any associated connectivity, thereby permitting any connected circuitry also to be tested so as to evaluate its viability in response to the metastable signal. Thus, this approach also allows incorrectly designed timing instances (synchronous or asynchronous) to be flushed out if the timing window is violated several times during testing, and it also is clearly beneficial over the prior art wherein instead an artificial value of "x" is generated and which has no meaning in the physical sense of propagating that signal to other circuits.

From the above, it may be appreciated that the preferred embodiments include consideration of metastability into the circuit design flow, at either or both the functional and gate level design levels. As a result of these added aspects, circuits designed according to design flows incorporating the preferred embodiments should be more resistant to metastability, thereby providing numerous benefits such as improved design cost and device yield. Thus, there are improvements upon the drawbacks of the prior art. Moreover, while the present embodiments have been described in detail, various substitutions, modifications or alterations could be made to the descriptions set forth above without departing from the inventive scope which is defined by the following claims.

The invention claimed is:

1. A computer program encoded in a computer-programmable medium for causing a computer to perform circuit design, by steps comprising:
   describing a first set of circuitry;
   describing a second set of circuitry;
   describing a digital signal for passing from the first set of circuitry to the second set of circuitry;
   detecting transitions of the digital signal with respect to a timing constraint of at least a portion of the second set of circuitry; and
   responsive to detecting metastability with respect to timing of a transition of the digital signal relative to the timing constraint of at least a portion of the second set of circuitry, forcing the digital signal to a random value and passing the random value to the second set of circuitry,
   whereby device yield is improved from circuits designed with this program.

2. The computer program of claim 1, wherein the step of detecting transitions is with respect to a timing constraint of at least a portion of only the second set of circuitry; and the step of detecting metastability is with respect to timing of a transition of the digital signal relative to the timing constraint of at least a portion of only the second set of circuitry.

3. A computer program encoded in a computer-programmable medium for causing a computer to perform circuit design modeling by steps comprising:
   simulating metastability in a design flow;
   describing a first set of circuitry;
   describing a second set of circuitry;
   describing a digital signal for passing from the first set of circuitry to the second set of circuitry;
   detecting transitions of the digital signal with respect to a timing constraint of at least a portion of the second set of circuitry; and
   responsive to detecting metastability with respect to timing of a transition of the digital signal relative to the timing constraint of at least a portion of the second set of circuitry, forcing the digital signal to a random value and passing the random value to the second set of circuitry.

4. The computer program of claim 3 and further comprising a step of, responsive to detecting no metastability with respect to timing of a transition of the digital signal relative to the timing constraint of at least a portion of the second set of circuitry, passing the digital signal to the second set of circuitry.

5. The computer program of claim 3 wherein the describing steps each comprises a step of functionally describing circuitry.

6. The computer program of claim 5 wherein the computer program is encoded in Verilog or VHDL.

7. The computer program of claim 5 wherein the computer program is encoded in register transfer level code or a language that describes and models circuitry.

8. The computer program of claim 3 wherein the describing steps each comprises a step of describing gate level circuitry.

9. The computer program of claim 3 wherein the second set of circuitry comprises a synchronizer.

10. The computer program of claim 9 wherein the second set of circuitry is asynchronous with respect to the first set of circuitry.

11. The computer program of claim 10 wherein the describing steps each comprises a step of functionally describing circuitry.

12. The computer program of claim 3 wherein the second set of circuitry is asynchronous with respect to the first set of circuitry.

13. The computer program of claim 3 wherein the second set of circuitry comprises a flip-flop.

14. The computer program of claim 13 wherein the describing steps each comprises steps of describing gate level circuitry.

15. The computer program of claim 3:
   wherein the second set of circuitry is responsive to a clock signal;
   wherein the detecting step comprises detecting whether the clock signal transitions during a time period following a transition of the digital signal; and wherein metastability is detected if the clock signal transitions during the time period.

16. The computer program of claim 3:
wherein the second set of circuitry is responsive to a clock signal;
wherein the detecting step comprises detecting whether the data signal transitions during a time period following a transition of the clock signal;
and metastability is detected if the data signal transitions during the time period.

17. The computer program of claim 3:
wherein the second set of circuitry is responsive to a clock signal;
wherein the detecting step comprises:
  detecting whether the clock signal transitions during a first time period following a transition of the digital signal; and
  detecting whether the data signal transitions during a second time period following a transition of the clock signal;
wherein metastability is detected if the clock signal transitions during the first or second time period.

18. A computer programmed to perform circuit design by steps comprising:
describing a first set of circuitry;
describing a second set of circuitry;
describing a digital signal for passing from the first set of circuitry to the second set of circuitry;
detecting transitions of the digital signal with respect to a timing constraint of at least a portion of the second set of circuitry; and
responsive to detecting metastability with respect to timing of a transition of the digital signal relative to the timing constraint of at least a portion of the second set of circuitry, forcing the digital signal to a random value and passing the random value to the second set of circuitry.

19. A method for handling circuit design flow by steps comprising:
simulating metastability using software encoded in register-transfer-language (RTL) by
describing a first set of circuitry;
describing a second set of circuitry;
describing a digital signal for passing from the first set of circuitry to the second set of circuitry;
detecting transitions of the digital signal with respect to a timing constraint of at least a portion of the second set of circuitry; and
responding to detection of metastability with respect to timing of a transition of the digital signal relative to the timing constraint of at least a portion of the second set of circuitry, forcing the digital signal to a random value and passing the random value to the second set of circuitry.

20. The method of claim 19, further comprising the steps of:
activating and deactivating the second set of circuitry using a clock signal;
wherein the detecting step comprises detecting whether the clock signal transitions during a time period following a transition of the digital signal; and
wherein metastability is detected if the clock signal transitions during the time period.

21. A process of manufacturing integrated circuits, the process comprising
preparing integrated circuit design code describing instances of integrated circuitry having a first digital circuitry and a second digital circuitry asynchronously fed with a digital signal by the first digital circuitry;
verifying the design code by processing the design code to detect metastability with respect to timing of a transition of the digital signal relative to a timing constraint of at least a portion of the second digital circuitry, and when the metastability is detected, propagating the digital signal with a random value to the second digital circuitry, whereby to exhibit an operational characteristic of actual circuitry when operating in a metastable condition;
evaluating viability of the second digital circuitry in response to the propagating digital signal with the random value, and if any effect then flushing out at least one instance in the design code of circuitry where metastability is detected; and
constructing the integrated circuits according to the design code thus flushed out, whereby the integrated circuits are more resistant to metastability.

* * * * *